(12) United States Patent
Massey et al.

(10) Patent No.: US 9,325,808 B2
(45) Date of Patent: Apr. 26, 2016

(54) MESSAGE HANDLING IN A DATA PROCESSING SYSTEM

(71) Applicant: International Business Machines Corporation, Armonk, NY (US)

(72) Inventors: Samuel T. Massey, Hursley (GB); Daniel J. McGinnes, Southampton (GB); Martin A. Ross, Hursley (GB); Craig H. Stirling, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 13/870,241

(22) Filed: Apr. 25, 2013

(65) Prior Publication Data

US 2013/0290411 A1    Oct. 31, 2013

(30) Foreign Application Priority Data

Apr. 26, 2012  (GB) .................................. 1207277.3

(51) Int. Cl.
    *G06F 15/16*    (2006.01)
    *H04L 29/06*    (2006.01)
    (Continued)

(52) U.S. Cl.
    CPC ................ *H04L 67/42* (2013.01); *G06F 9/546* (2013.01); *H04L 67/2804* (2013.01); *H04L 69/22* (2013.01)

(58) Field of Classification Search
    CPC ..... H04L 67/42; H04L 69/22; H04L 67/2804; G06F 9/546
    USPC .......... 709/203, 206, 207, 208, 217, 230, 238
    See application file for complete search history.

(56) References Cited

U.S. PATENT DOCUMENTS

| 4,394,726 A * | 7/1983 | Kohl | G06F 13/287 710/25 |
| 2005/0264581 A1* | 12/2005 | Patrick | H04L 65/4076 345/594 |

(Continued)

FOREIGN PATENT DOCUMENTS

| CN | 2011073359 | 11/2011 |
| JP | 2008204430 | 9/2008 |

(Continued)

OTHER PUBLICATIONS

International Search Report and Written Opinion dated Aug. 20, 2013 for Application No. PCT/IB2013/051825.

(Continued)

*Primary Examiner* — David Lazaro
*Assistant Examiner* — Vitali Korobov
(74) *Attorney, Agent, or Firm* — Cantor Colburn LLP

(57) ABSTRACT

An exemplary embodiment of this disclosure is a method for operating a data processing system, where the data processing system includes a service bus connected between a client and a server. The service bus includes one or more applications configured to mediate message flow between the client and the server. The method includes receiving a message from the client at the service bus, and mediating the message at a message-mediating application of the service bus. The mediation includes adding a header to the message, the header defining a source and a predetermined condition under which a target can respond directly to the source. The source is either the client or an application of the service bus, and the target is either an application of the service bus or the server.

17 Claims, 6 Drawing Sheets

(51) Int. Cl.
 H04L 29/08 (2006.01)
 G06F 9/54 (2006.01)
 G06F 15/173 (2006.01)

(56) References Cited

U.S. PATENT DOCUMENTS

| | | | |
|---|---|---|---|
| 2006/0155852 A1* | 7/2006 | Mayer | G06F 17/30867 709/227 |
| 2010/0223217 A1 | 9/2010 | Little | |
| 2010/0223344 A1 | 9/2010 | Little | |
| 2011/0119395 A1* | 5/2011 | Ha | H04L 47/2416 709/231 |
| 2011/0196824 A1 | 8/2011 | Maes | |
| 2011/0289512 A1* | 11/2011 | Vecera | H04L 67/1008 719/313 |

FOREIGN PATENT DOCUMENTS

| | | |
|---|---|---|
| JP | 2011170636 A | 9/2011 |
| WO | 2005114452 A2 | 12/2005 |
| WO | 2009007281 A1 | 1/2009 |
| WO | 2011140914 A1 | 11/2011 |

OTHER PUBLICATIONS

Ekanayake et al., "A Scalable Communication Runtime for Clouds" 2011 IEEE 4th International Conference on Cloud Computing, pp. 211-218.

Lin et al., "Research on ESB framework for enterprise application integration"; Journal of Computer Applications, vol. 30, No. 6, Jun. 2010; 3 pages.

UK Search Report mailed Aug. 17, 2012 for Application No. GB1207277.3; 3 pages.

Ziyaeva et al., "Content-Based Intelligent Routing and Message Processing in Enterprise Service Bus", IEEE Computer Society; International Conference on Convergence and Hybrid Information Technology 2008, title page and pp. 245-249.

\* cited by examiner

MESSAGE HANDLING IN A DATA PROCESSING SYSTEM

CROSS-REFERENCE TO RELATED APPLICATIONS

This application claims priority to Great Britain Patent Application No. 1207277.3, filed 26 Apr. 2012 and all the benefits accruing therefrom under 35 U.S.C. §119, the contents of which in its entirety are herein incorporated by reference.

BACKGROUND

Embodiments of the present invention relate to a method of operating a data processing system and, more particularly, to message handling in a data processing system.

Enterprise service bus (ESB) is a software architecture model used for designing and implementing the interaction and communication between mutually interacting software applications in service oriented architecture. As a software architecture model for distributed computing, it is a variant of the more general client-server software architecture model and provides a message oriented design for communication and interaction between applications. Its primary use is in the integration of heterogeneous computing systems.

Existing ESB implementations allow for two-way operations. A simple example would be mediating a message on a request flow before initiating an invocation of a given service, and then providing a response flow to mediate the response from the given service back to the client application. It is not uncommon to have a response flow that does not perform any enrichment, transformation, mediation or auditing, but simply pushes the response back to the client application without performing any actions, which is inefficient both in processor and network utilization for the ESB.

SUMMARY

An exemplary embodiment of this disclosure is a method of processing data. The method includes receiving a message from a client at a service bus connecting the client to a server, and mediating the message at a message-mediating application of the service bus. The mediation includes adding a header to the message, the header defining a source and a predetermined condition under which a target can respond directly to the source. The source is at least one of the client and an application of the service bus, and the target is at least one of the server and an application of the service bus.

In another embodiment a data processing system includes a service bus connected between a client and a server. The service bus includes one or more applications configured to mediate message flow between the client and the server. The service bus is configured to receive a message from the client and mediate the message, where such mediation includes adding a header to the message. The header defines a source and a predetermined condition under which a target can respond directly to the source. The source is either the client or an application of the service bus, and the target is either an application of the service bus or the server.

In yet another embodiment, a computer program product includes a computer readable storage medium having computer readable program code embodied thereon. The computer readable program code is executable by a processor to perform a method for processing data. The method includes receiving a message from a client at a service bus connecting the client to a server, and mediating the message at a message-mediating application of the service bus. The mediation includes adding a header to the message, the header defining a source and a predetermined condition under which a target can respond directly to the source. The source is at least one of the client and an application of the service bus, and the target is at least one of the server and an application of the service bus.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

BRIEF DESCRIPTION OF THE SEVERAL VIEWS OF THE DRAWINGS

Exemplary embodiments of the present invention will now be described, by way of example only, with reference to the following drawings, in which.

DETAILED DESCRIPTION

Figure 1:
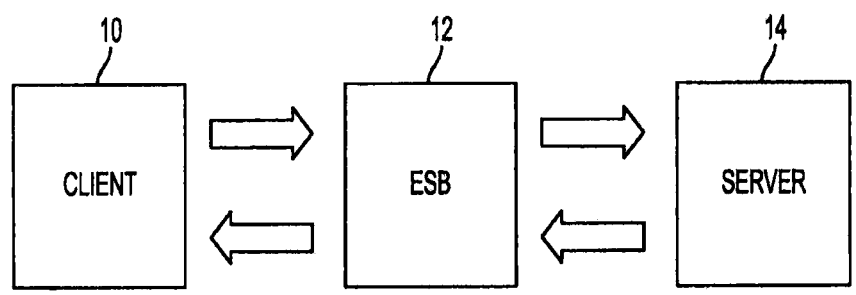
FIGS. 1 and 2 are schematic diagrams of a data processing system, in accordance with an exemplary embodiment of the present invention.

According to some embodiments of this disclosure, enhanced data processing performance and function may be delivered in, for example, an enterprise service bus product, which may provide reduced processing and network load within the service bus. The enterprise service bus may detect empty response flows for given service responses, may send a control packet to the a component in the service bus to indicate the service bus is being bypassed, and may route a response message to the client calling system based on data initially propagated to the service. For the purposes of this disclosure, a response flow refers to the processes involved in mediating a response from a back-end server to the client application. A response flow is said to be empty when the processing is equivalent to a static routing, i.e., there is no data enrichment, transformation, mediation or auditing.

At the message target, it may be detected that the message header meets a predetermined condition. In that case, a response to the message may be transmitted directly to the source as defined in the header of the mediated message. Therefore, the data processing system may be able to determine when a response flow is empty, route a response directly to the client system when the service bus response flow is empty, utilize information of the available response flows (e.g., such as fault messages/invalid responses/valid responses) to route different service responses accordingly and allow partial optimization and propagation of data through multiple applications to allow for more complex analysis and routing.

An exemplary data processing system has a client and an end server with a service bus in between. A source and target, where in a simple embodiment the source is the client and the target is the server, may be configured so that when a message originates from the source for the target, the service bus may define specific circumstances in which the target can communicate directly with the source rather than back through all the components of the service bus. The end server may communicate back directly to the client device in specific circumstances, rather than communicating through the service bus. A message-mediating application of the service bus may add a header to the original message that defines when the target can communicate directly with the source. This reduces the amount of processing in the service bus on the return leg, as part or all of the service bus is bypassed by the target communicating directly with the source.

A message may be transmitted from the source to the target to indicate safe receipt of the direct response, and a message may be transmitted from the target to the message-mediating application to indicate safe receipt of the direct response. The data processing system may detect when the direct response has not been safely received at the source and, in that case, may transmit a response to the message-mediating application of the service bus instead. The target may be configured to monitor that the source has safely received the direct response, and the target may communicate with the service bus to ensure that proper transaction methodology is followed. If, for some reason, the direct message does not reach the originating source or the target does not believe that message has reached the source, then the target may communicate the response to the service bus, to ensure that the original message is handled.

FIG. 1 is a schematic diagram of a data processing system, in accordance with an exemplary embodiment of the present invention. As shown, the data processing system comprises a client 10, a server 14, and a service bus 12 connected between the client 10 and the server 14. The service bus 12 may comprise one or more applications that are configured to mediate message flow between the client 10 and the server 14. The client 10 and server 14 may be unable to communicate directly with each other and may thus need the service bus 12 to mediate between them. It is common for legacy computing systems to be incompatible with new services or applications, and the service bus 12 may be required in these cases.

The three components shown in FIG. 1 may be three separate machines positioned in different locations, or they may be composed of individual software environments located on the same physical machine. The client 10 may be an application that wishes to use the functionality of a service provided by the server 14. For whatever reason, the client 10 may be unable to deal directly with the server 14, but must send a message to the service bus 12. The service bus 12 may mediate the message and ultimately forward it to the server 14. Similarly, the server 14 may send the response to the service bus 12, which may then mediate the received response and send it back to the client 10.

The service bus 12 may be made up of one or more individual applications that manage request flows and response flows of messages that are received from clients 10 and servers 14. A request flow of an application of the service bus 12 may mediate an incoming message from a client 10. The service bus 12 may send the mediated message to the server 14. A response flow of an application of the service bus 12 may mediate the reply from the server 14 for forwarding to the original requesting client 10. In this way, the client 10 and server 14 can communicate despite their potential incompatibility.

The data processing system of FIG. 1 optimizes the response flow processing in, for example, an ESB implementation. The client system 10 may be the system directly invoking the ESB implementation. The service bus 12 may provide data propagation in a protocol header to the back-end service provided by the server 14 with information regarding the client systems and information regarding supported responses and response flow optimization viability. Essentially, an application of the service bus 12 may mediate a message received from a client 10, the mediation including adding a header to the message. The header may define a source and a condition under which a target can respond directly to the source.

Figure 2:
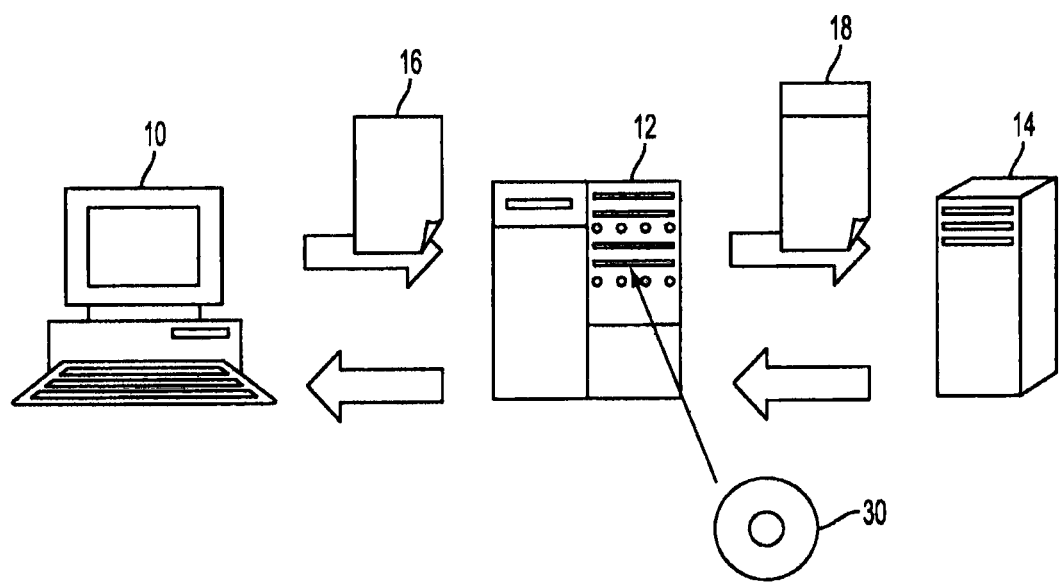

FIG. 2 is a second schematic diagram of a data processing system, in accordance with an exemplary embodiment. As shown in FIG. 2, the client 10 may transmit a message 16 to the service bus 12. An application of the service bus 12 may mediate the message 16, including adding a header 18 to the message 16. The header 18 may define a source (e.g., the client 10) and a condition under which a target (e.g., the server 14) can respond directly to the client 10. Therefore, in addition to the normal mediation performed by the service bus 12, the service bus 12 may add the header 18 to the outgoing message to define the circumstances under which the server 14 can respond directly to the client 10, without having to reply to the service bus 12.

The target (e.g., the server 14) may receive the mediated message 16 and, if it detects that the condition within the header 18 of the mediated message 16 is satisfied, may transmit a response directly to the source (e.g., the client 10) as defined in the header 18 of the mediated message 16. The response that would normally be sent to the service bus 12 for mediation and forwarding to the client 10 may be instead sent directly to the client 10, bypassing the service bus 12. The server 14 may perform its normal operation in various regards except in relation to the routing of its response to the request from the client 10, which may be dictated by the header 18.

The server 14 can respond directly to the client 10 when the response flow for a specific request is empty. In this case, the service bus 12 need not perform any mediation or other action with respect to the response for this specific request other than routing the response to the original client 10. An empty response flow may be used to pass through the response from the server 14 to the client 10 without any mediation from the service bus 12. In normal operation of a data processing system that uses a service bus 12, this leads to an inefficient use of processing and network resources, since data is being unnecessarily routed through the service bus 12.

In FIG. 2, the service bus 12 may operate under the control of a computer program product, which is provided by a computer readable medium 30, which is represented in FIG. 2 as a CD-ROM 30. The computer program product on the medium 30 comprises a series of instructions that control the mediation of the message 16 once it is received by the service bus 12. The instructions may define the receipt of the message 16 and how the service bus 12 mediates the message 16 by adding the header 18 to the message 16. The header 18 may define the source of the message 16 and the circumstances under which the ultimate target of the message 16 can respond directly to the source of the message 16.

The data processing system may implement a method for detecting empty response flows. For example, the data processing system may detect whether any empty response flows exist at runtime or deploy-time. This detection may be implementation dependent. For example, in an IBM® WebSphere® Enterprise Service Bus (WESB) implementation, it is possible to interrogate the connections of nodes initially handling responses from service invocations to ascertain if any direct connections exist to a node handling the sending of a response back to the service consumer/client application, or by examination of the xml file(s) storing the mediation flow data. The information about empty response flows may then be stored in cache or in mediation metadata and data can be propagated to a back-end service. Other implementations of service buses may use methods specific to those implementations to detect the empty response flows. IBM and WebSphere are trademarks of International Business Machines Corporation, registered in many jurisdictions worldwide.

Figure 3:
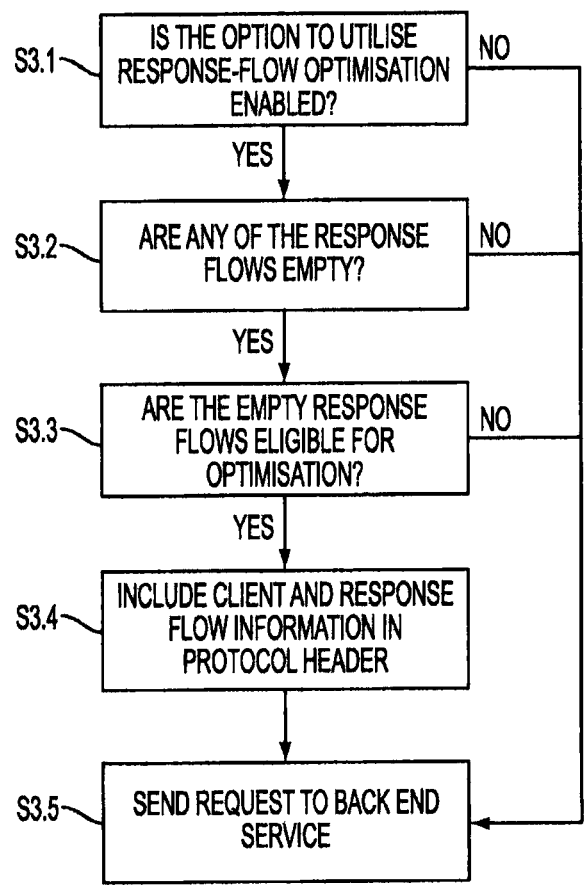
FIG. 3 is a flowchart of a method of operating a service bus, in accordance with an exemplary embodiment of the present invention.

FIG. 3 shows a flowchart illustrating operation of a service bus 12 implementing the feature of optimizing the network load by allowing the server 14 to communicate directly with the client 10, after receipt of a message 16. At block S3.1, a check is made to see that the optimization is enabled, as a network administrator should have the capability to enable or disable the feature. If enabled, at block S3.2, a check is made to see if any response flows are empty. If so, a further check is made at block S3.3 to see if the response flows are eligible for optimization. For example, this check might determine whether any custom code has been added to the service bus implementation that could mean that the service bus 12 cannot rely on the response flow being empty as meaning that the specific response flow is eligible for optimization. If the answer at block S3.3 is yes, then at block S3.4, the mediation by the service bus 12 may comprise including details of the client 10 and the response flow in the header 18 of the message that is sent to the server 14, which may determine the form of the request sent to the server 14 in block S3.5.

Figure 4:
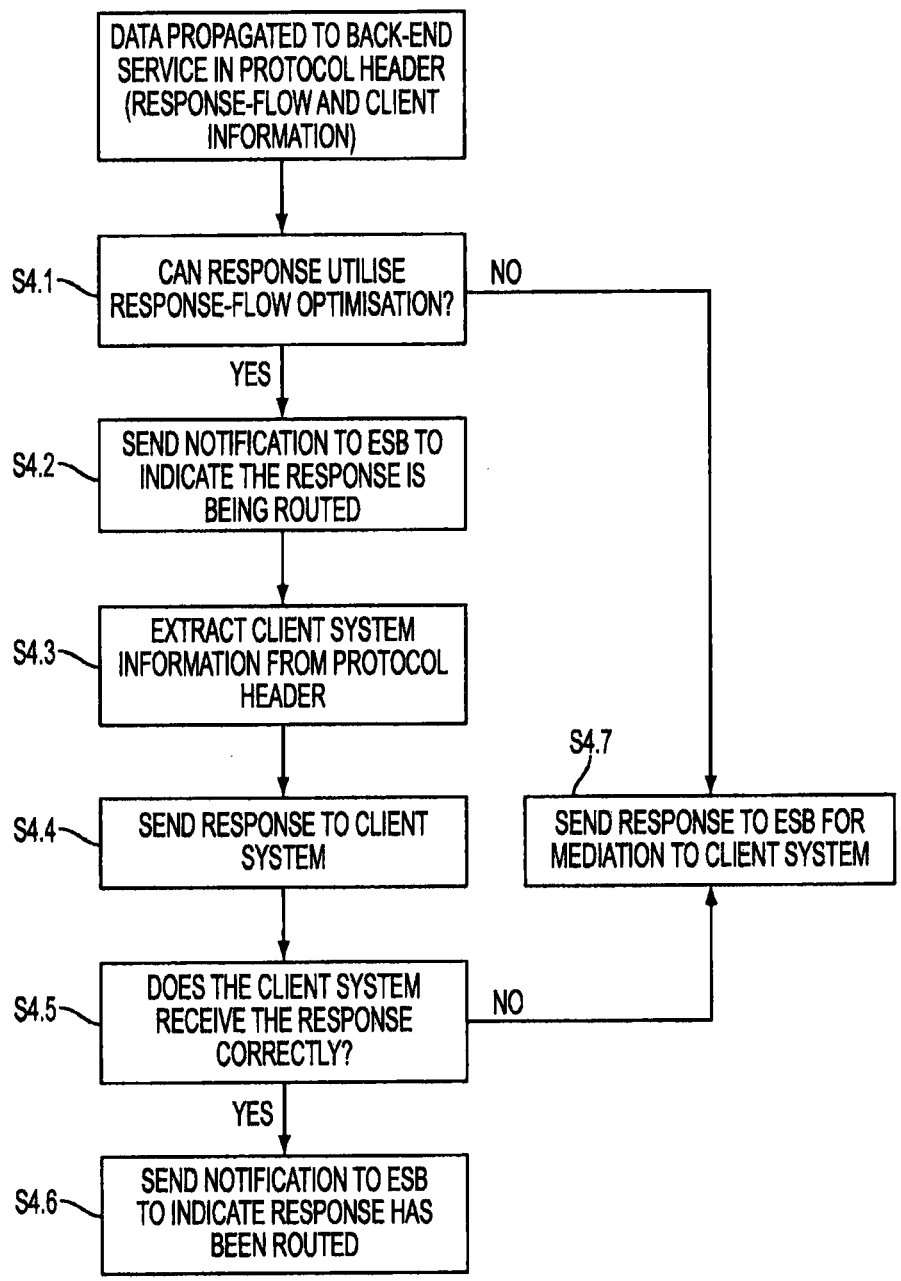
FIG. 4 is a flowchart of a method of operating a server, in accordance with an exemplary embodiment of the present invention.

FIG. 4 is a flowchart that illustrates the operation of the server 14. The data that the server 14 needs may be propagated in the header 18 of the received message, as described above. At block S4.1, the server 14 may check to see if the response that it will provide to the original request matches a condition in the header 18. If not, then the process moves to block S4.7 and the server 14 may respond to the service bus 12 in a conventional manner. If yes however, then at block S4.2 a notification may be sent from the server 14 to the service bus 12 that a direct response to the original message will be made to the original requester (e.g., the client 10).

At block S4.3, the server 14 may extract data from the header 18 of the message that defines the client 10, such as an appropriate network address for the client 10, and at block S4.4, this data may be used to transmit a response directly to the client 10. At block S4.5, a check is made to see if the client 10 has acknowledged safe receipt of the response. If not, then the process moves to block S4.7 and the server 14 may respond to the service bus 12 in a conventional manner. If yes however, then at block S4.6, the server 14 may send a notification to the service bus 12 to indicate that direct routing has been successfully used.

The block S4.5, of checking whether a response is received (i.e., checking whether the "handshake" between the client 10 and server 14 if the ESB 12 is cut-out), is optional, as a quality of service may be utilized that is using best-effort, whereby a message may be lost under certain circumstances. In FIG. 4, block S4.4 may optionally connect directly to block S4.6, bypassing block S4.5, depending on the environment configuration, for example if using a reduced quality of service.

The server 14 may provide a method for instructing the ESB implementation 12 that the response flow is being circumnavigated and may send a packet to the ESB 12 to indicate that the flow has completed. The server 12 may parse data in the protocol header 18 to route the response message to the appropriate client system 10. The back-end sever 14 may thus be responsible for data/transaction/Quality of Service (QOS).

The server 14 may use this methodology if it identifies that the condition within the header 18 is satisfied. So for certain types of requests, only a subset of the possible responses may utilize the direct response to the original source of the request.

Figure 5:
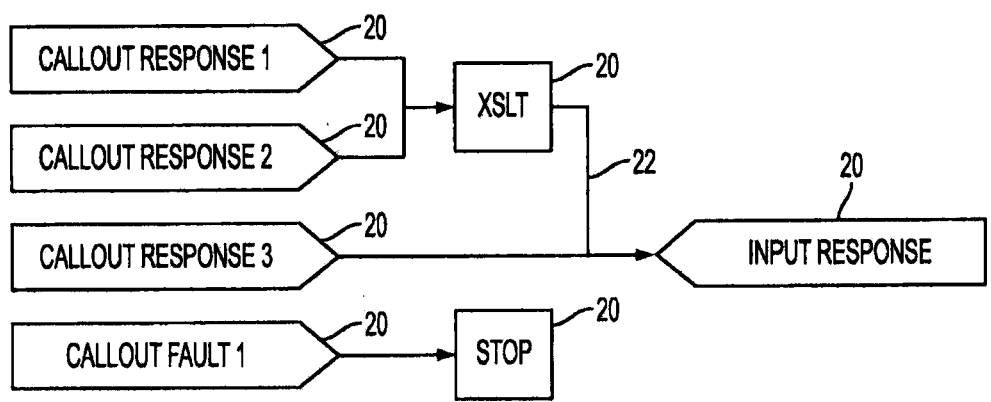
FIG. 5 is a schematic diagram of a sample response flow in a service bus, in accordance with an exemplary embodiment of the present invention.

FIG. 5 details a sample response flow for the service bus 12. The flow comprises nodes 20 that are connected via arrows 22. Each node 20 can be considered to represent some logic that may be invoked by the service bus 12 if the necessary conditions are satisfied with respect to a received message 16. The node 20, labelled "callout response 1," refers to a node 20 representing logic that may be invoked when a response is received from a service 1 provided by a server 14 in relation to a received message 16 from a client 10. Similarly "callout response 2" and "callout response 3" refer to services 2 and 3 respectively from further servers 14.

In the example of FIG. 5, the node 20 labelled "input response" refers to logic that may be invoked in order to return a message to the original client 10 that triggered the communication to the server 14. A response from either callout 1 or callout 2 may be first transformed in an Extensible Stylesheet Language Transformation (XSLT) node 20 before a response is sent to the client system 10. However, a response from callout 3 may be sent directly to the client system 10. A fault response from callout 1 may result in a stop. From this figure, it can be seen that different responses from the same server 14 will be handled in different ways, according to the logic that is defined within the service bus 12.

If the application itself is eligible for the response flow optimization, then any valid responses from callout 3 (resulting in callout response 3 being invoked) may be viable candidates for the optimization. If callout 3 is invoked in the request flow, then information may be propagated to the back-end service 14 in the header 18, indicating that a valid response should be routed directly to the client system 10 indicated. In this way, the logic of the service bus 12 can be monitored to decide when it is appropriate for the server 14 to be informed that a specific type of response does not need to be returned to the service bus 12, but can go directly to the originating client 10.

Figure 6:
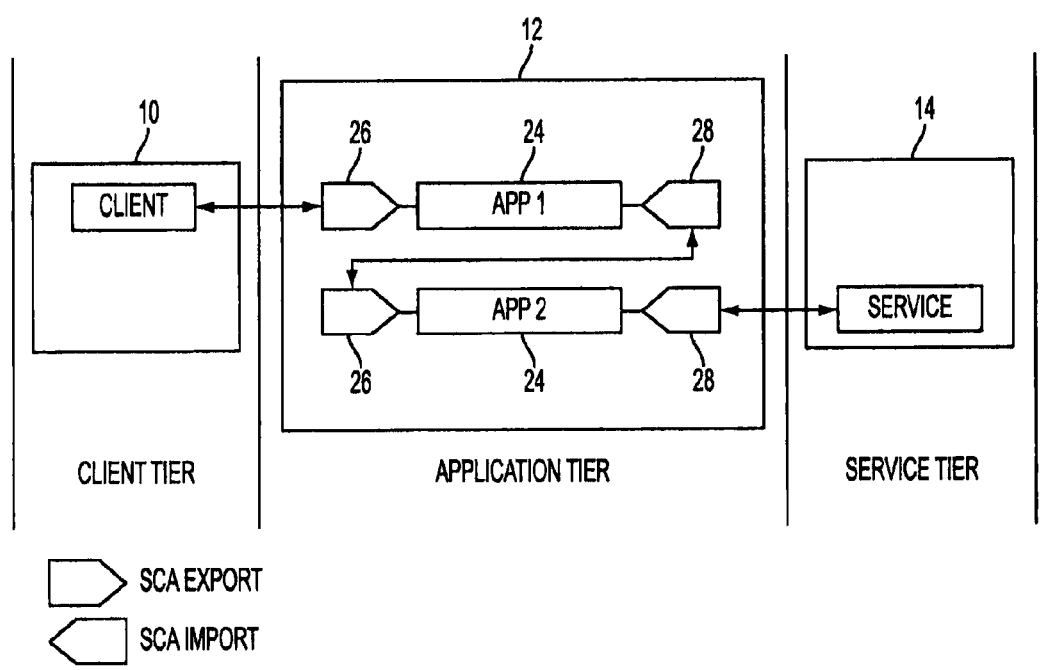
FIG. 6 is a further schematic diagram of a data processing system, in accordance with an exemplary embodiment of the present invention.

In some implementations of service buses, such as IBM WebSphere® ESB it is possible to connect individual applications 24 of the service bus 12 through imports 26 and exports 28, as shown in FIG. 6. In this type of implementation, the client system for the ESB application 24 finally invoking the back-end service 14 could be another application 24 within the service bus 12. Although the message chain in the data processing system is client-service bus-server, the source and target that optimize the response routing are not necessarily the ends of the chain (e.g., the client 10 and the server 14). The source may be the client 10, and the target may be an application 24 of the service bus 12. Alternatively, the source may be an application 24 of the service bus 12, and the target may be the server 14.

In the example of FIG. 6, the application App 2 may hold information on which responses to application App 1 meet the criteria for the optimization, which may be propagated to the back-end server 14 in the protocol headers. In this respect, depending on the design and functionality of the response flows for App 1 and App 2, the back-end server 14 may send a response to App 2, which may then send a response to App 1, which may then respond directly to the client system (without optimization); or the server 14 may send a response to App 2, which may then shortcut App 1 and respond directly to the client system 10 (partial optimization); or the server 14 may shortcut App 2 and send a response to App 1, which may then respond directly to the client system (a different partial optimization); or the server 14 may shortcut both App 2 and App 1 and send a response directly to the client system 10 (full optimization).

In the optimization, part or all of the service bus 12 may be bypassed. This is achieved by a header being added to the ongoing message, where the header indicates to a component further down the chain the circumstances under which direct routing may take place and to whom the direct routing should be directed. Since the client 10 may be making a request to the server 14 that will result in many megabytes of data being transmitted to the client 10, any optimization of the routing of such a response may save significant processing and network resources. The server 14 or the application 24 that is the target of the optimization may respond to a component further back in the chain that was not the component that actually called the server 14 or application 24.

As will be appreciated by one skilled in the art, aspects of the present invention may be embodied as a system, method, computer program product, or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified

The invention claimed is:

1. A method for operating a data processing system comprising a service bus connected between a client and a server, the service bus comprising one or more applications configured to mediate message flow between the client and the server, the method comprising:
receiving a message from the client at the service bus, the message destined for the server; and
mediating the message at a message-mediating application of the service bus, the mediation comprising adding a header to the message, the header identifying the client and a condition under which the server can respond directly to the client; and
wherein, in response to the condition in the header of the mediated message being satisfied the server transmits a response directly to the client, as identified in the header of the mediated message, bypassing the message-mediating application of the service bus.

2. The method according to claim 1, further comprising:
receiving the mediated message at the server;
detecting whether the condition in the header of the mediated message is satisfied; and
transmitting a direct response directly to the client as identified in the header of the mediated message.

3. The method according to claim 2, further comprising transmitting a message from the client to the server to indicate safe receipt of the direct response.

4. The method according to claim 3, further comprising transmitting a message from the server to the message-mediating application to indicate safe receipt of the direct response from the server to the client that bypassed the message-mediating application.

5. The method according to claim 2, further comprising:
detecting, by the server, that the direct response has not been safely received at the client; and
in response to the detection, transmitting, by the server, a response to the message-mediating application of the service bus.

6. A data processing system comprising:
a service bus connected between a client and a server, the service bus comprising a message mediation application configured to mediate message flow between the client and the server, and the service bus being configured to receive a message from the client and mediate the message via the message mediation application, the mediation comprising adding a header to the message, the header defining a source and a condition under which a target can respond directly to the source bypassing the message mediation application, the source comprising either the client or an application of the service bus and the target comprising either an application of the service bus or the server.

7. The system according to claim 6, the target being configured to receive the mediated message, detect whether the condition in the header of the mediated message is satisfied, and in response to the condition being satisfied, transmit a direct response directly to the source as defined in the header of the mediated message, wherein the transmission of the direct response directly to the source bypasses the message mediation application.

8. The system according to claim 7, wherein the source is configured to transmit a message to the target to indicate safe receipt of the direct response.

9. The system according to claim 8, wherein the target is further configured to transmit a message to the message mediation application to indicate safe receipt of the direct response.

10. The system according to claim 7, wherein the target is further configured to detect that the direct response was unsuccessful to reach the source and, in response, to transmit a response to an application of the service bus that indicates the unsuccessful direct response.

11. The system according to claim 6, wherein the service bus comprises a plurality of applications, the source comprises a first application in the service bus, and the target comprises a second application in the service bus.

12. A computer program product comprising a non-transitory computer readable storage medium having computer readable program code embodied thereon, the computer readable program code executable by a processor to perform a method for processing date, the method comprising:
receiving a message from a client at a service bus connecting the client to a server, and
mediating the message at a message-mediating application of the service bus, the mediation comprising adding a header to the message, the header defining a source and a condition under which a target can respond directly to the source bypassing the message-mediating application; and
wherein the source comprises at least one of the client and an application of the service bus, and wherein the target comprises at least one of an application of the server and the service bus.

13. The computer program product according to claim 12, the method further comprising:
receiving the mediated message at the target;
detecting whether the condition in the header of the mediated message is satisfied; and
transmitting a direct response directly to the source as defined in the header of the mediated message by bypassing the message-mediating application.

14. The computer program product according to claim 13, the method further comprising transmitting a message from the source to the target to indicate safe receipt of the direct response.

15. The computer program product according to claim 14, the method further comprising transmitting a message from the target to the message-mediating application to indicate safe receipt of the direct response.

16. The computer program product according to claim 13, the method further comprising:
detecting that the direct response has not been safely received at the source; and
transmitting a response to the message-mediating application of the service bus instead.

17. The computer program product according to claim 12, wherein the source comprises a first application in the service bus, and the target comprises a second application in the service bus.

* * * * *